UNITED STATES PATENT OFFICE.

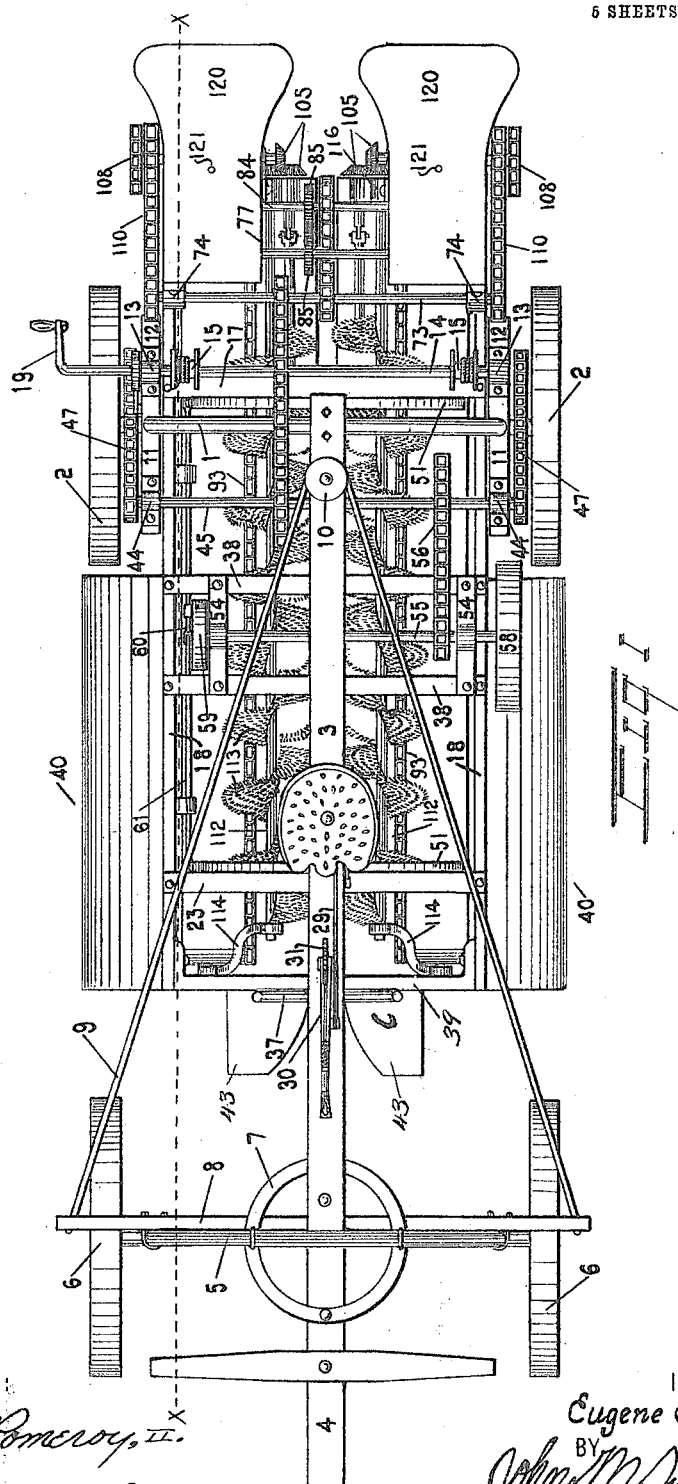

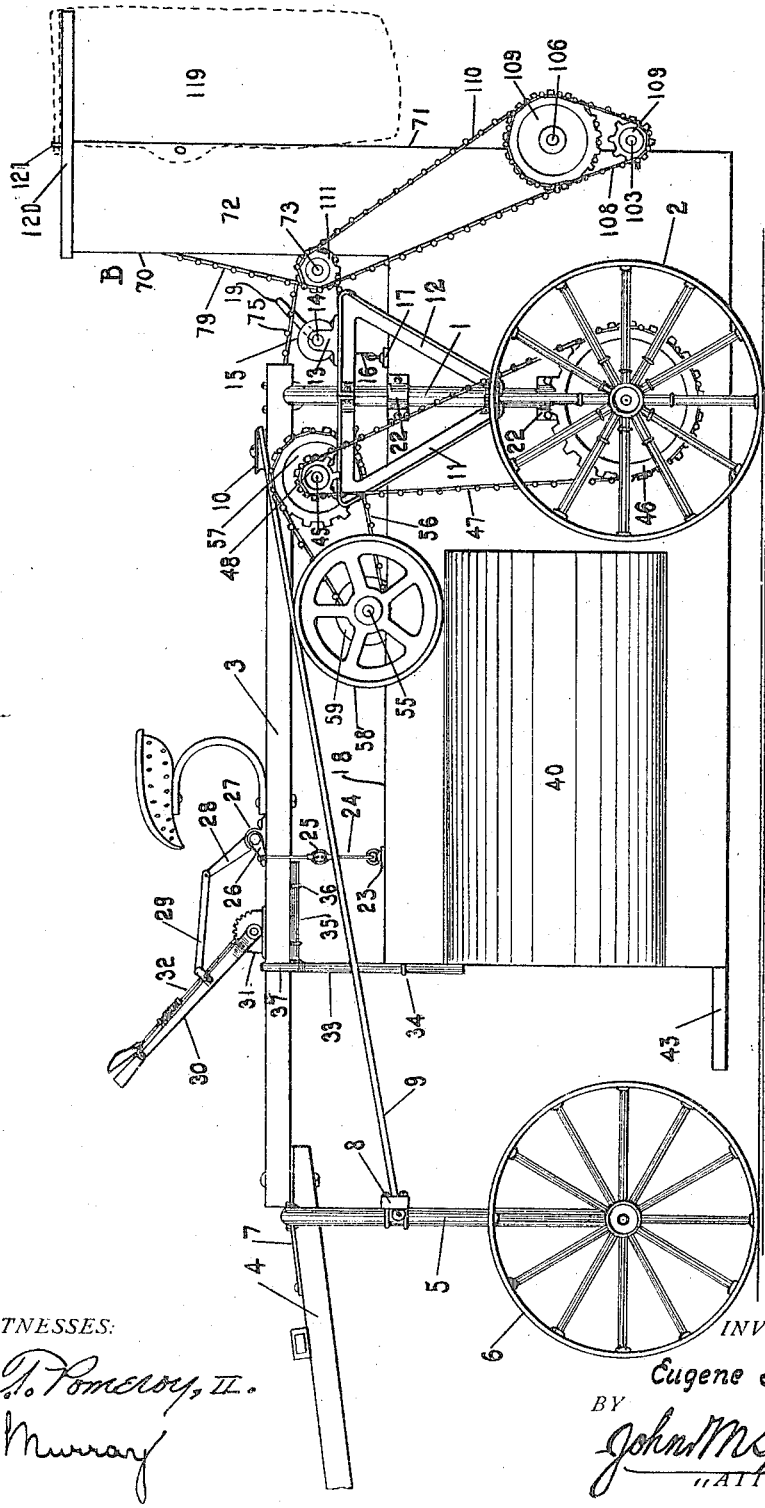

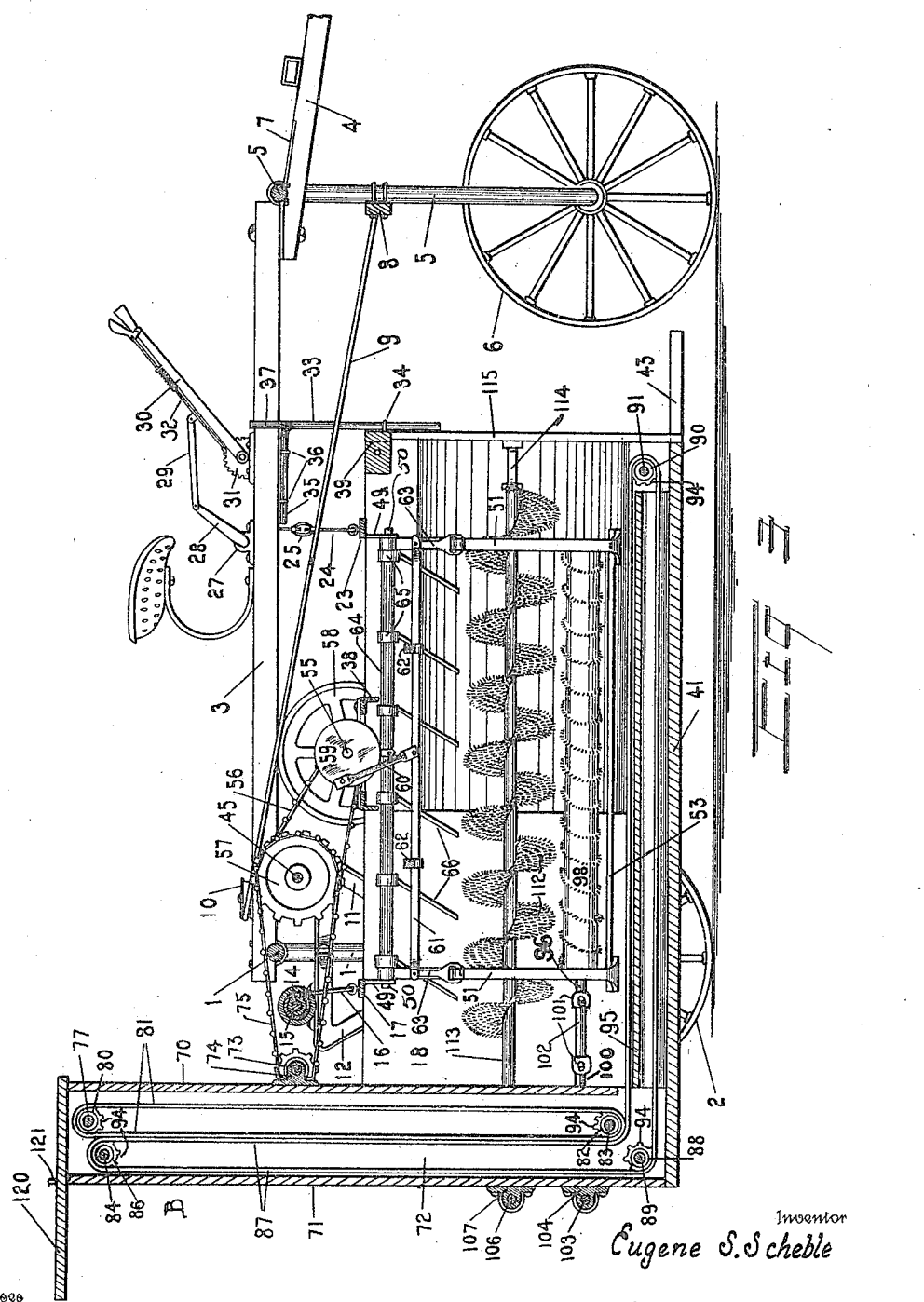

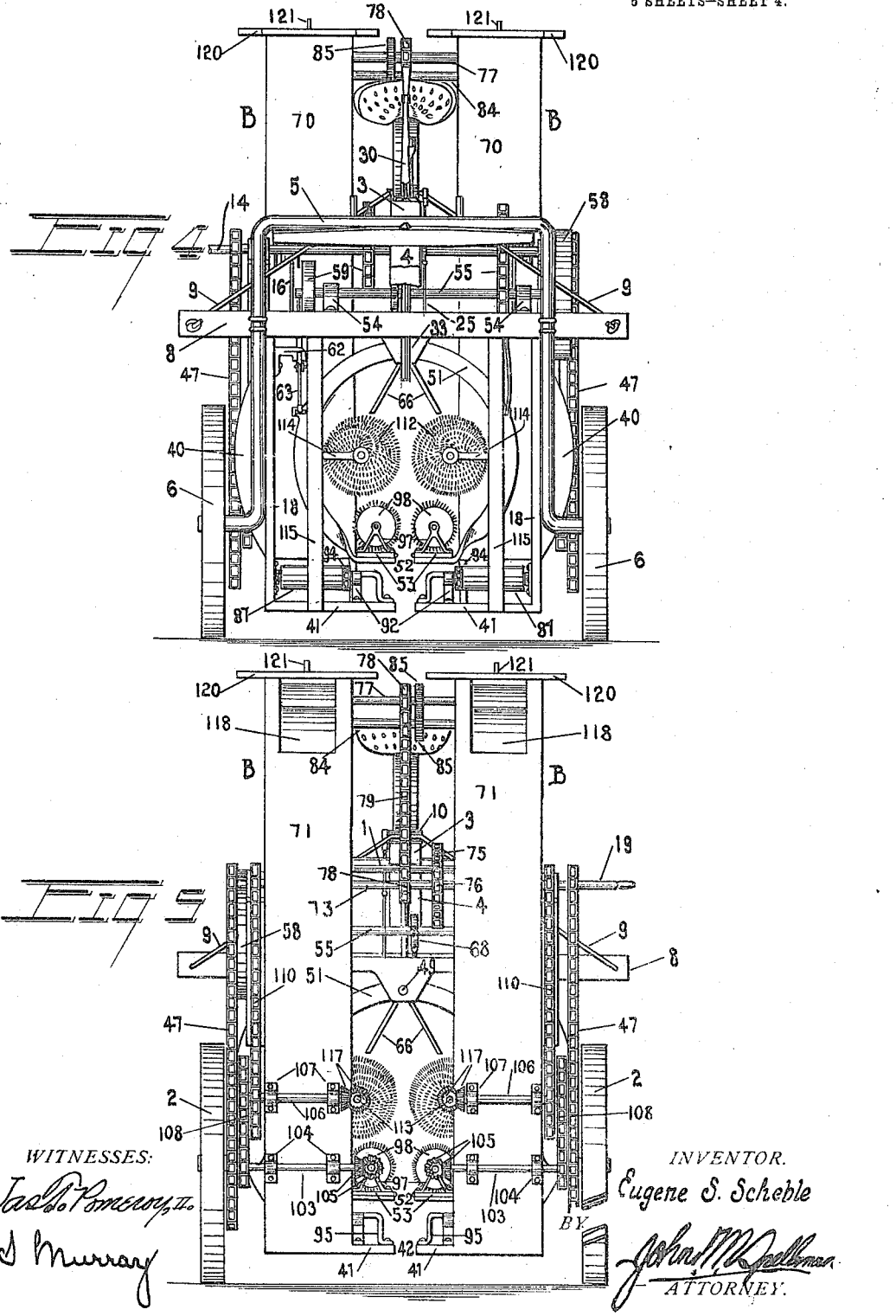

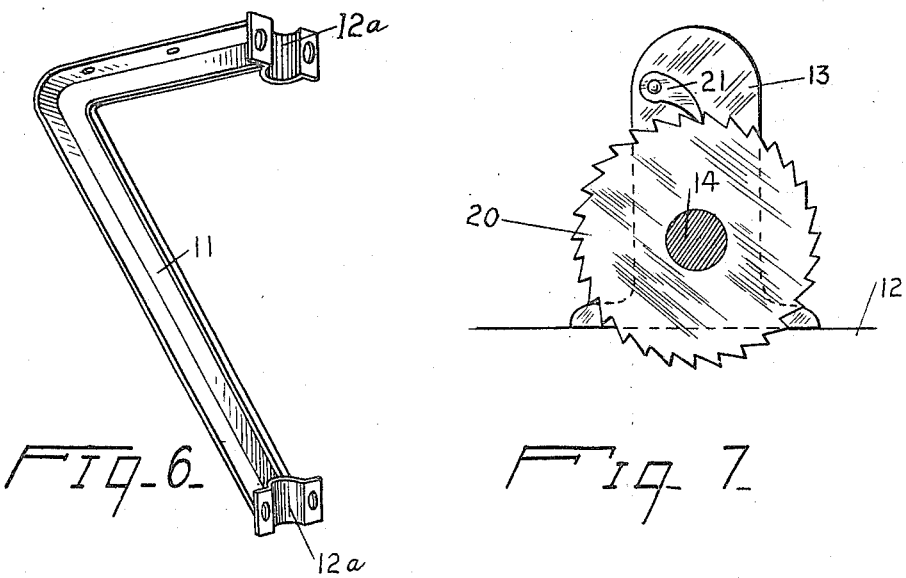
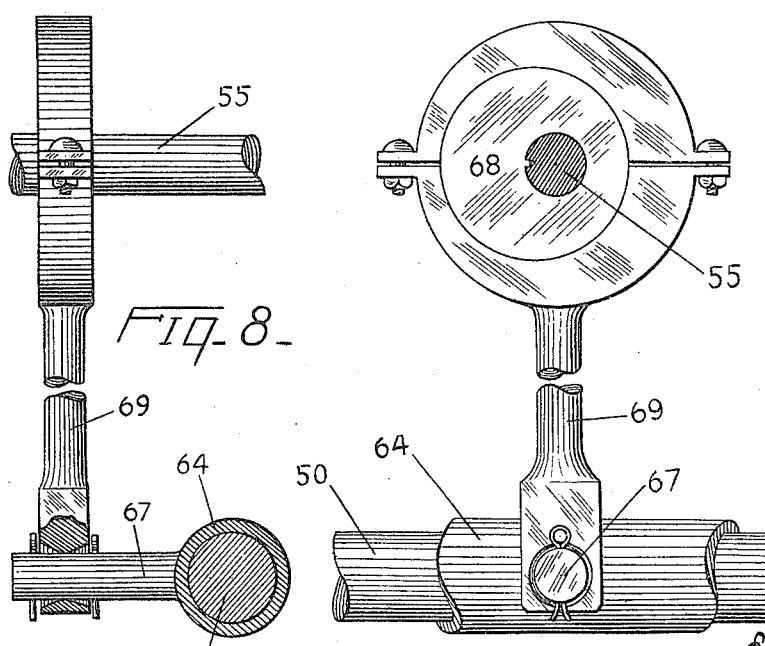

EUGENE S. SCHEBLE, OF CLEBURNE, TEXAS, ASSIGNOR OF FORTY ONE-HUNDREDTHS TO D. F. WELCH, W. A. ROBERTS, AND A. S. LEWIS, ALL OF DALLAS, TEXAS.

COTTON-PICKER.

1,123,601.   Specification of Letters Patent.   Patented Jan. 5, 1915.

Application filed February 17, 1912, Serial No. 678,359. Renewed August 22, 1914. Serial No. 858,133.

*To all whom it may concern:*

Be it known that I, EUGENE S. SCHEBLE, citizen of the United States, residing at Cleburne, in the county of Johnson and State of Texas, have invented certain new and useful Improvements in Cotton-Pickers, of which the following is a specification.

My invention relates to new and useful improvements in cotton pickers, and relates more particularly to certain improvements upon the structure covered by the applicant's co-pending application, filed May 8, 1911, under Serial Number 625684.

The object of the invention is to provide a machine, mounted upon a suitable wheeled frame, which will be adapted to travel along a row of cotton plants, removing the cotton therefrom mechanically, and depositing it through mechanical means in suitable receptacles carried by said frame, the work being accomplished more quickly and economically than may be done by manual labor.

A further object is to provide a cotton picker in which are embodied novel mechanisms for subjecting the stems of cotton plants to a rapid succession of violent shocks, and for simultaneously agitating the upper branches of the plants, thus dislodging the cotton.

A still further object of the invention is to provide a cotton picker upon which are mounted a number of cylindrical brushes adapted to be rotated and to contact with a row of cotton plants at each side thereof for the purpose of removing the cotton.

Still another object of the invention lies in the provision of a novel belt conveyer system, adapted to catch the cotton as it is shaken or brushed from the plants, and to convey it to a point at the rear of the machine sufficiently elevated to permit the cotton to be discharged into receptacles provided for the purpose.

Finally, the object of the invention is to provide a device of the character described, that will be strong, durable, simple and efficient, and comparatively easy to construct, and also one, the various parts of which will not be likely to get out of working order.

With these and various other objects in view, my invention relates to certain novel features of the construction and operation, an example of which is described in the following specification, and illustrated in the accompanying drawings, wherein:

Figure 1 is a plan view, showing the complete cotton picker. Fig. 2 is a view of the machine in side elevation. Fig. 3 is a longitudinal vertical sectional view of the machine, the section being taken upon the line $x$—$x$ of Fig. 1. Fig. 4 is a front view of the machine. Fig. 5 is a rear view. Fig. 6 is a detail perspective view showing a special form of bracket, several of which enter into the construction of the machine. Fig. 7 is a detail view showing a pawl and ratchet mechanism which is correlated with a drum shaft by which the rear end of the cotton picker frame may be raised or lowered. Figs. 8 and 9 comprise two detail views of an eccentric, by which a rocking motion is communicated to a certain sleeve.

Referring now more particularly to the drawings, wherein like reference characters designate similar parts in all the figures, the numeral 1 denotes the arched rear axle of the cotton picker, and 2 the rear wheels mounted loose upon the out-turned extremities of said axle. At the center of the axle 1 is supported the rear end of a horizontal beam 3, which is parallel with the direction of travel of the machine, and has its forward end pivoted upon the rear extremity of a tongue 4, inclining slightly downward toward its front end. The tongue 4 projects slightly beneath the arched front axle 5 at the center thereof and is rigidly secured to said axle by any suitable means. The axle 5, which will preferably be equal in its dimensions to the rear axle, will carry upon out-turned extremities a pair of front wheels 6. The object in providing a pivotal connection between the tongue 4 and the beam 3 is to permit a change in the direction of travel of the machine, by swinging the rigidly connected tongue and front axle at an angle with said beam. In order to strengthen the connection between the tongue and front axle, a fifth wheel 7 is mounted at the juncture of said parts, said wheel having the form of a ring centrally mounted beneath the front axle, its front portion being riveted or bolted upon the tongue and its rear portion extended beneath the beam 3.

When the cotton picker is being drawn across a field, the forwardly acting strain, to which the front axle is subjected, tends to swing the axle from its proper vertical position, bringing its journal portions ahead of its center. To counteract this tendency a bar 8 is horizontally mounted across the vertical portions of the front axle and to its extremities are secured those of a cable 9. The cable is extended rearwardly and inwardly from each point of connection with the bar 8, and is carried at its middle or rear portion by a sheave 10 horizontally mounted upon the rear end of the beam 3. This construction prevents the lower or journal portions of the front axle from being swung out of vertical alinement with the top bar thereof, but does not hinder the axle from being swung about the pivotal connection between the tongue 4 and beam 3.

Upon each of the two vertical portions of the rear axle, a pair of similar brackets 11 and 12 are clamped, the former being at the front and the latter to the rear of the correlated axle. Each of said brackets comprises a horizontal upper member having one of its extremities vertically grooved to receive the axle as indicated at $12^a$, an inclined lower member integrally connected with the outer end of the horizontal member, and also provided with a groove $12^a$ at its lower end to receive the axle. Upon the rear end of brackets 12 are mounted opposite bearings 13, which receive the extremities of a shaft 14 extending transversely above the frame of the machine. Adjacent to each bearing 13, a drum 15 is mounted fast upon the shaft 14, and upon each drum is wound a rope 16. The ropes 16 have their extremities secured to a horizontal beam 17, transversely extended between the side walls 18 of the frame. By subjecting the shaft 14 to rotation, and thereby winding the ropes 16 on or off their respective drums, the frame which carries the cotton picking mechanism may be raised or lowered. By thus making provision for the vertical adjustment, it is made possible for the operator to elevate the frame when transporting the machine to or from a field, thus preventing said frame from creating any impediment to travel. In order that rotation may be manually communicated to the shaft 14 a crank 19 is integrally provided upon one extremity of said shaft. In order that the frame may be held at various heights, a pawl and ratchet mechanism is correlated with the shaft 14, comprising a ratchet wheel 20 fast upon said shaft, and a pawl 21 pivoted upon one of the bearings 13 and engaging the teeth of said ratchet wheel. Since the rear extremity is supported by a flexible means, i. e. the ropes 16, it is essential that a further means be provided to prevent said extremity from swinging about, in a horizontal direction. This means consists in guide brackets 22, a pair of which are mounted in vertical alinement upon the outer surface of the wall 18, the vertical portions of the rear axle being extended through said brackets. These brackets guide the frame during vertical adjustment and also prevent any motion either lateral or forward and back. The forward extremity of the frame is also adapted to be vertically adjusted, and a description will now be given of the mechanism for accomplishing this result. A bar 23 is extended between the front portions of the walls 18, and to the center of said bar is attached the lower extremity of a rod 24, made extensible by means of an ordinary turn-buckle 25. The upper end of the rod 24 is attached to one arm of a bell-crank, said arm being designated by the numeral 26. The bell-crank is provided with a journal portion between its two arms, said portion being received by a bearing 27, mounted upon the beam 3. The other arm of the bell-crank, which is denoted by the numeral 28, has connection with one end of a rod 29 having its other end pivotally attached to the middle portion of a lever 30. The lower extremity of said lever is pivoted at the center of a quadrant 31 mounted rigidly upon the beam 3, the usual spring-pressed rod 32 being carried by the lever and conjoined with the quadrant to hold the lever in various positions of adjustment. It is apparent from the foregoing description that by swinging the lever 30, the bell-crank 26 and 28 may be subjected to an angular displacement whereby the front end of the frame may be raised or lowered.

A description will now be given of a device by which the front extremity of the frame may be subjected to a slight lateral displacement in either direction. Directly beneath the beam 3 is mounted a vertical rod 33 having its lower portion slidably received by an eye-bolt 34 projecting from the front of the frame. The rod 33 is given a right angle bend at its top, thereby forming an integral horizontal rod 35 extending rearwardly, and passing through a pair of eye-bolts 36, provided upon the under surface of the beam 3. At the junction of the rods 33 and 35, a pair of opposite laterally extending members 37 are connected, said members having their extremities turned upward a short distance. The operator by pressing downward with his foot upon the extremity of either member 37, can subject the rod 35 to a slight rotation and swing the lower end of the rod 33 to either side, thus producing a corresponding displacement of the front end of the frame. The connections just described are made with sufficient play to permit the operation set forth.

A more detailed description will now be given of the frame of the cotton picker. Mention has already been made of cross bars 17 and 23 extending between the upper edges of the side walls 18. Said edges are further connected at their middle portions by a pair of spaced transverse bars 38, preferably formed of angle iron. At the front end of the frame still another bar 39 is extended between the upper edges of the side walls. The bars 17, 23, 38 and 39 serve to hold the side walls rigid in a permanent relation to each other. The front portion of each side wall is formed of a metal sheet 40 having its middle portion gradually curved out from the top and bottom edges thus producing a cylindrical surface. The bottom of the frame is formed by two platforms 41 rigidly connected with the lower edges of the walls 18 and extending the full length of said walls. The inner edges of the two platforms 41 are spaced from each other a short distance, thus producing a longitudinal central slot 42 in the bottom, extending from end to end. As the cotton picker travels along a row, the plants of the row pass through the slot 42, and are acted upon by the picker mechanism during this passage. In order to guide the plants into the slot, extending portions 43 are provided upon the forward extremities of the platforms, said portions having their edges gradually curved outward so as to form an entrance to the slot, of gradually reduced width.

The brackets 11 carry a pair of opposite bearings 44, in which are mounted the extremities of a drive-shaft 45, from which shaft the various mechanisms comprising the machine are operated. The shaft 45 is itself driven from the rear wheels, which carry large sprocket wheels 46, correlated through a chain 47 with small sprocket wheels 48 fast upon the extreme ends of the shaft 45.

A description will now be given of a mechanism by which the stems of the plants, as they pass through the slot 42, are subjected to a series of shocks, following each other in rapid succession, and acting alternately from each side of the row, thereby oscillating the plants violently and shaking loose the cotton. The two crossbars 17 and 23 are provided at their centers with hanger bearings 49, which receive the extremities of a rock-shaft 50, longitudinally mounted in the top portion of the frame. Adjacent to each of the bearings 49, a large ring 51 is hung upon the shaft 50, transversely of the frame, said ring having an opening at the bottom, approximately equal in width to the slot 42, and designated by the numeral 52. The bottom portions of each ring 51, adjacent to the opening 52 are bent horizontal and are made to support a pair of spaced boards 53, extended between the two rings. The opposite edges of the boards 53 are normally vertically alined with the slot 42, so that the plants of a row in passing through said slot, must pass between the boards 53. The end portions of the shaft 50 pass through the tops of the rings 51, and are rigidly connected with said rings by setscrews or other suitable means so that the rings must oscillate in unison when the shaft is rocked.

The mechanism which transmits an oscillating motion to the rings 51 from the drive shaft 45 will now be explained. A pair of bars 54 are extended transversely across the end portions of the bars 38, and are provided at their centers with bearings to receive the extremities of a shaft 55, transverse of the frame. Rotation may be communicated to the shaft 55 from the shaft 45 by a chain 56 carried by sprocket wheels 57, one of which is fast upon each of said shafts. Enough slack is provided in the chain 56 to allow for the vertical adjustment of the frame carrying the cotton picking mechanism. At one end of the shaft 55, outside of the frame, a fly-wheel 58 is mounted for the purpose of maintaining the momentum of said shaft. Upon the other extremity of the shaft 55, there is carried a crank-wheel 59, occupying a position between the adjacent bar 54 and the side wall 18. The upper extremity of a pitman 60 is mounted upon said crankwheel, and its lower extremity is pivotally connected to the adjacent ends of two oppositely extending rods 61, substantially horizontal and parallel to the adjacent wall 18. These rods terminate opposite to the two rings 51 respectively, and are pivotally supported by brackets 62, one of which is mounted upon the wall 18, a short distance from each ring 51. A connecting rod 63, substantially vertical, is extended between the lateral portion of each ring 51 and the adjacent extremity of the rod 61.

From the foregoing description it is apparent that during the travel of the machine, rotation will be communicated to the shafts 45 and 55 from the rear transporting wheels, and that the rotation of the latter shaft will transmit an oscillating motion to the bars 61, which motion will be communicated from said bars through the connecting rods 63 to the rings 51. The rapid oscillating movement given to the bars 53 by said rings, will bring said bars alternately into sudden contact with the stems of the plants between said bars, dislodging the cotton from the plants, as a result of these frequent shocks. It is to be understood that there must be some looseness or freedom of motion in the connections between the rods 61 and their pivots, as well as between said rods and the connecting rods 63, in order to permit the necessary transmission of motion.

A description will now be given of a mechanism employed to violently agitate the upper branches of the cotton plants as they pass through the machine, which mechanism acts in conjunction with the oscillating bars 53, to shake loose the cotton. Upon the rock-shaft 50, between the rings 51, an elongated sleeve 64 is mounted loose, and upon said sleeve are mounted fast a number of equally spaced collars 65. From each collar 65, a pair of divergent rods 66 are extended downwardly at a rearward inclination, the length of said rods being sufficient to permit their end portions to contact with the upper branches of the plants as they pass through the machine. From the middle of the sleeve 64, an arm 67 projects rigidly in a lateral direction, beneath the shaft 55. Above the outer end of the arm 67 an eccentric 68 is mounted fast upon the shaft 55, the eccentric rod 69 being extended downward and pivotally connected to the arm 67. From the foregoing description, it is clear that the shaft 55, by its rotation, produces a reciprocating motion of the rod 69, thus transmitting a rocking movement to the sleeve 64, and causing the rods 66 to oscillate back and forth among the branches of the plants, shaking loose the cotton.

An explanation will now be given of a belt-conveyer system, the function of which is to catch the cotton which has been dislodged from the plants, convey the same to the rear extremity of the machine, and elevate it to such a height that it may be discharged into suitable receptacles. At the rear extremity of the frame, vertically elongated boxes B are provided at each side thereof, their front and rear walls being denoted by the numerals 70 and 71 respectively and their side walls by the numeral 72. These boxes extend vertically from the rear ends of the platforms 41 to an elevation considerably above that of the beam 3. A horizontal shaft 73 is extended across the front walls of the boxes B a short distance above the side walls, the extremities of said shaft being received by bearings 74, one of which is mounted upon each wall 70. Rotation may be communicated from the shaft 45 to the shaft 73 through a chain 75 carried by sprocket wheels 76 one of which is mounted upon each of said shafts. A shaft 77 parallel with the shaft 73 is mounted at the upper extremities of the boxes B, its end portions being extended into the front portions of said boxes. Between the two boxes a sprocket wheel 78 is carried and is adapted to be driven by a chain 79, passing also over another sprocket wheel 78 carried centrally upon the shaft 73. Upon the shaft 77 are mounted two pulleys 80, respectively positioned within the two boxes B, and upon each of said pulleys is mounted the upper extremity of a vertically extended belt 81. The lower ends of the belts 81 are carried by pulleys 82, respectively carried by shafts 83, one of which is transversely mounted in the lower portion of each box B, with its extremities journaled in the side walls 72.

Adjacent to the shaft 77, and slightly to the rear thereof, is mounted a parallel shaft 84, adapted to receive rotation from the shaft 77 through a pair of intermeshed gears 85 carried by the middle portions of said shafts, between the boxes B. The end portions of the shaft 84 project into the upper portions of the boxes and respectively carry pulleys 86 within said boxes. Upon each pulley 86 is mounted the upper end of a belt 87, the parallel sides of which extend downward within the boxes, their forward sides being contiguous with the rear sides of the belt 81, as is clearly shown in Fig. 3. At the lower ends of the boxes B, the belts 87 are each turned at right angles and extended horizontally forward, a short distance above the platforms 41. In making this turn, the front side of each belt 87 is supported by the adjacent pulley 82, or rather by that portion of the belt 81 having contact with said pulley. The rear sides of the belts 87, in making the 90 degree turn, rest respectively upon pulleys 88, each of which is centrally mounted upon a shaft 89, transversely positioned in the lower rear portion of the correlated box B. After turning, as described, the belts 87 extend horizontally to the front end of the frame, there being mounted upon pulleys 90 carried by shafts 91. Said shafts are mounted in bearings 92, which are supported by the forward ends of the platforms 41. In order to eliminate any possibility for the belts 81 and 87 to slip, sprocket chains 93 are attached to the inner edges of said belts and are made to engage sprocket-wheels 94, one of which is rigidly secured to each of the pulleys 80, 82, 86, 88 and 90. Between the two horizontal portions of each belt 87, a false floor 95 is interposed, the lateral edges of the same being turned down and rigidly secured to the underlying platform 41. The functions of the belts 81 and 87, and of the false bottoms, just described, will later be fully explained.

A description will now be given of certain means for removing the cotton from the plants, which supplement the oscillatory boards 53 and the rods 66 already described. A short distance above each of the boards 53, a shaft 96 is mounted extending longitudinally of the machine, and having its extremities received by bracket members 97 one of which is rigidly mounted at each end of each board. Each shaft 96 carries a long drum 98, having its surface provided with bristles, thus constituting a cylindrical brush. These two brushes are spaced a distance substantially equal to that between the boards 53 so that they will contact with the plants at each side of the row. Upon the inner side walls 72 of the boxes B, are mounted short pieces of horizontal shafting 100, each substantially alined with one of the shafts 96. It is intended to communicate rotation to the shafts 96 from the shafts 100 respectively, and since the supporting means of the former are subjected to oscillation during the travel of the machine, it is necessary to accomplish the transmission of power through flexible connections, each comprising two universal couplings 101 and a short piece of shafting 102 joining said couplings. A shaft 103 is mounted upon the rear side 71 of each box B, in bearings 104, and rotation may be communicated from each shaft 103 to each shaft 100 by a pair of intermeshed bevel-gears 105. A shaft 106 is mounted a short distance above each shaft 103 and parallel thereto, a pair of bearings 107 being provided upon the rear surface of each box B, to receive the correlated shaft 106. Rotation may be communicated from each shaft 106 to the adjacent shaft 103, through a chain 108, passing over a pair of sprocket wheels 109, one of which is carried upon the outer end of each shaft. The shafts 106 are themselves adapted to be driven from the shaft 73 by a chain 110, passing over sprocket wheels 111, one of which is carried upon the end portion of each shaft. It is thus apparent that the cylindrical brushes are adapted to rotate during the travel of the machine, the rotation being such that the inner or opposite faces of the brushes travel upwardly.

Still another form of rotation brush will now be described, of which there are also a pair, one being mounted above each of the brushes 98 longitudinally of the machine. These upper brushes are designated by the numeral 112 and are formed by mounting bristles thickly upon both edges of a metal strip, helically mounted upon a shaft 113. The parts 112 and 113, in conjunction, very closely resemble the commonly used spiral conveyer. The forward ends of the two shafts 113 are mounted in brackets 114 projecting from a pair of uprights 115 extending from the top to bottom of the frame at the front end thereof. The rear extremities of said shafts are received by bearings 116 mounted upon the inner side walls 72 of the boxes B. The shafts 113 are adapted to receive rotation respectively from the shafts 106, this being accomplished in each case by a pair of bevel gears 117, one being carried upon the inner end of the shaft 106 and the other by the rear end of the shaft 113. Thus it will be seen that the brushes 112 will rotate during the travel of the machine, their opposite faces moving upward, and contacting with the upper branches of the cotton plants at each side of the row.

An explanation will now be given with regard to the operation of the various mechanisms to which the foregoing description relates. The machine is propelled either by horse power or some source of mechanical energy along a row of cotton in such a way that the plants pass through the slot 42. During the passage of the plants through the machine, they are simultaneously acted upon by the oscillating members 53 and 66 and by the rotating brushes 98 and 112, which engage the plants at each side of the row.

The cotton which has been dislodged by the various means, above specified, drops to the bottom portion of the machine and falls upon the rearwardly traveling surfaces of the two belts 87. The cotton is thus conveyed to the rear portion of the machine and there passes between the two contiguous surfaces of the belts 81 and 87. Since these two belts travel upwardly at a uniform rate of speed, the cotton is held between them and elevated to the upper extremities of the boxes B. Each of said boxes is provided at its upper extremity with a rectangular aperture 118, and as the cotton escapes from between the two belts it is discharged rearwardly above the pulleys 86 and through the apertures 118. Suitable receptacles may be secured to the rear surfaces of the boxes B to receive the cotton as it is thus discharged. These receptacles will preferably have the form of sacks 119, the mouth of each sack being spread to pass over a board 120 forming the top of each box B and projecting to the rear thereof. A peg 121 surmounted upon the board 120 receives the upper edge of the sack and holds it from slipping. The side of the sack may be divided by a slit, the edges of which may be spread apart and secured at the side of the box B, thus allowing the cotton to enter the sack from the apertures 118.

It is to be observed that the application of this invention is not limited to the cotton picker, since it may also be employed to remove boll weevils and other parasites from the plants.

Various changes may be made in the construction and proportion of parts without departing from the spirit of the invention, and the device is therefore presented as including all such changes and modifications as may be included within the scope of the following claims.

What I claim is:

1. The combination in a cotton picker, of a wheel supported frame, said frame being rigidly sustained, a transversely swinging hanger mounted in the frame, striking members fixed in the hanger and having a stalk receiving slot therebetween, a pair of elongated brush members rotatably mounted in the hanger in fixed relation to each other and disposed on opposite sides of the slot between the striking members, means for revolving the brush member, means for swinging the hanger, and spiral brushes rotatably mounted in the frame.

2. The combination in a cotton picker, of a wheel supported frame, said frame being rigidly sustained, a transversely swinging hanger in the frame, striking members fixed in the hanger and having a stalk receiving slot there-between, a pair of elongated brush members rotatably mounted in the hanger in fixed relation to each other, one of said brush members being disposed on each side of the slot between the striking members, means for revolving the brushes, means for swinging the hanger, cotton removing brushes rotatably mounted in the frame above the brush members, means mounted on the frame for operating the cotton removing brushes, and cotton conveying means traveling through the frame adjacent the brush members and associated with the cotton removing brushes and arranged in the path of cotton removed by the brush members and the removing brushes and having a discharge connection at the rear portion of the frame.

3. The combination in a cotton picker, of a wheel supported frame, said frame being rigidly sustained, a transversely swinging hanger in the frame, striking members fixed in the hanger and having a stalk receiving slot there-between, a pair of elongated brush members, rotatably mounted in the hanger and in fixed relation to each other, one of said brush members being disposed on each side of the slot between the striking members, means for revolving the brushes, means for swinging the hanger, cotton removing brushes rotatably mounted in the frame above the brush members, means mounted on the frame for operating the cotton removing brushes, and a cotton agitating device mounted longitudinally of the frame and above the cotton removing brushes.

4. The combination in a cotton picker, of a wheel supported frame, said frame being rigidly sustained, a transversely swinging hanger in the frame, striking members fixed in the hanger and having a stalk receiving slot therebetween, a pair of elongated brush members mounted in the hanger, in fixed relation to each other, one of said brush members being disposed on each side of the slot between the striking members, means for revolving the brushes, means for swinging the hanger, cotton removing members, disposed in the frame above the brush members, means mounted on the frame for operating the cotton removing members, cotton conveying means traveling through the frame adjacent the brush members and at each side of the cotton removing members and arranged in the path of the cotton removed by the brush members and the removing members and having a discharge connection at the rear portion of the frame, and a cotton agitating device mounted longitudinally of the frame and above the cotton removing members.

5. The combination in a cotton picker, of a wheel supported frame, a pair of supports fixed on the frame, a rock shaft supported in bearings carried by the supports and extending longitudinally of the frame, a pair of hangers mounted on the rock shaft, a pair of elongated brush members rotatably mounted in the hangers in fixed relation to each other and adjacent the bottom of the frame, operating means mounted on the frame and connected with the hanger, revolving brushes mounted in the frame above the brush members, and discharge belts disposed adjacent the brush members and below the revolving brushes and mounted longitudinally of the frame.

6. The combination in a cotton picker, of a wheel supported frame, said frame being rigidly sustained, a transversely swinging hanger in the frame, striking members fixed in the hanger and having a stalk receiving slot therebetween, a pair of elongated brush members mounted in the hanger in fixed relation to each other, one of said brush members being disposed on each side of the slot between the striking members, means for revolving the brushes, means for swinging the hanger, cotton removing members, disposed in the frame above the brush members, means mounted on the frame for operating the cotton removing members, cotton conveying means traveling through the frame adjacent the brush members at each side of the cotton removing members and arranged in the path of cotton removed by the brush members and the removing members, and an elevator at the rear end of the frame provided with discharge openings at its upper portion and connected with the cotton conveying means.

7. In a cotton picker, the combination with a wheel supported frame, hangers mounted in the frame, elongated brush members mounted in the hangers, elongated brushes mounted in the frame above the brush members and adjacent the hangers, of a rocking member mounted in the frame longitudinally thereof above the brushes and connected with the hanger, divergent rods connected to the rocking member and arranged to swing in unison therewith, and a device mounted on the frame arranged to impart motion to the rock shaft.

8. The combination in a cotton picker, of a wheel supported frame, elongated stalk guiding members in relative fixed relation and separated sufficiently to provide a longitudinal restricted slot in the lower portion of the frame in position to receive the stalks of cotton plants, transversely swinging striking members mounted within the frame, a brush member mounted over each striking member adjacent the vertical plane of the slot between the striking members, and a revoluble brush mounted over each brush member and adjacent the vertical plane of the slot of the striking members.

9. The combination in a cotton picker, of a wheel supported frame, elongated stalk guiding members in relative fixed relation and separated sufficiently to provide a longitudinal restricted slot in the lower portion of the frame in position to receive the stalks of cotton plants, transversely swinging striking members mounted within the frame, a brush member mounted over each striking member adjacent the vertical plane of the slot between the striking members, a revoluble brush mounted over each brush member and adjacent the vertical plane of the slot of the striking members, and a rearwardly traveling conveyer disposed on each board and disposed laterally of the adjacent brush member.

10. The combination in a cotton picker with a wheel supported frame, and revoluble brushes mounted longitudinally of the frame and fixed against displacement transversely thereof, of transversely swinging hangers mounted in the frame, elongated members connecting the hangers longitudinally of the frame and separated in relative fixed relation whereby an elongated narrow slot is provided therebetween, and a revoluble brush member mounted between the hangers longitudinally of each hanger connecting member and adjacent the inner edge thereof.

11. The combination in a cotton harvester, of a portable frame, a transversely swinging hanger mounted in the frame, a pair of spaced striking members fixed in the hanger, a pair of rotatable brush members fixed on the hanger over the striking members, a pair of spiral rotatable brushes mounted in the frame over the brush members and supported against longitudinal and transverse movement, means for driving the brush members, and means for driving the spiral brushes.

12. The combination in a cotton harvester, of a portable frame, spaced elongated striking members in the frame moving transversely thereof, spaced rotating brush members disposed parallel to the striking members and moving transversely in the frame, and a pair of rotating spiral brushes fixed in the frame against longitudinal and transverse movement and disposed longitudinally of the frame.

In testimony whereof I have signed my name to this specification in the presence of two subscribing witnesses.

EUGENE S. SCHEBLE.

Witnesses:
W. E. BERRY,
W. J. FIFE, Jr.

Copies of this patent may be obtained for five cents each, by addressing the "Commissioner of Patents, Washington, D. C."